(12) United States Patent
Thompson et al.

(10) Patent No.: US 9,486,890 B2
(45) Date of Patent: Nov. 8, 2016

(54) BLAST NOZZLE TARGETING APPARATUS

(71) Applicant: The Boeing Company, Chicago, IL (US)

(72) Inventors: Robert B. Thompson, Media, PA (US); Aneesa P. Romans, West Chester, PA (US)

(73) Assignee: The Boeing Company, Chicago, IL (US)

( * ) Notice: Subject to any disclaimer, the term of this patent is extended or adjusted under 35 U.S.C. 154(b) by 38 days.

(21) Appl. No.: 14/325,777

(22) Filed: Jul. 8, 2014

(65) Prior Publication Data

US 2016/0008941 A1    Jan. 14, 2016

(51) Int. Cl.
| | | |
|---|---|---|
| *B23Q 17/24* | (2006.01) | |
| *B24C 1/04* | (2006.01) | |
| *B24C 1/08* | (2006.01) | |
| *B24C 5/02* | (2006.01) | |

(52) U.S. Cl.
CPC ............ *B23Q 17/2423* (2013.01); *B24C 1/04* (2013.01); *B24C 1/086* (2013.01); *B24C 5/02* (2013.01)

(58) Field of Classification Search
CPC .......... B23Q 17/2423; B23Q 17/2414; B23Q 17/24; B24C 1/04
See application file for complete search history.

(56) References Cited

U.S. PATENT DOCUMENTS

| | | | | |
|---|---|---|---|---|
| 3,919,541 A * | 11/1975 | Chao | ................ | B25B 23/18 362/120 |
| 4,078,869 A * | 3/1978 | Honeycutt | ............. | B25F 5/021 33/286 |
| 4,283,757 A * | 8/1981 | Nalbandian | ............ | B25B 23/18 362/119 |
| 5,868,840 A | 2/1999 | Klein, II et al. | | |
| 6,663,260 B1 * | 12/2003 | Tieszen | ............. | G01N 21/8806 362/249.02 |
| 6,890,135 B2 * | 5/2005 | Kopras | ................. | B25F 5/02 144/136.95 |
| 6,896,192 B2 | 5/2005 | Horan et al. | | |
| 7,040,546 B2 * | 5/2006 | Horan | ................. | B05B 12/004 239/1 |
| 7,200,516 B1 * | 4/2007 | Cowley | ................ | B23B 49/00 356/138 |
| 7,270,593 B2 | 9/2007 | Klein, II et al. | | |
| 8,104,186 B2 * | 1/2012 | Raschella | ............... | F41G 1/35 33/265 |
| 8,245,410 B1 * | 8/2012 | Morihara | .............. | G01B 11/27 33/286 |
| 8,324,531 B2 * | 12/2012 | Turner | ................. | B23K 9/127 219/136 |
| 8,517,642 B2 * | 8/2013 | Borunda | ................ | B23B 49/00 324/67 |
| 2003/0095402 A1 * | 5/2003 | Lin | ...................... | B25B 23/18 362/119 |
| 2003/0178503 A1 * | 9/2003 | Horan | ................. | B05B 12/004 239/73 |
| 2005/0132589 A1 * | 6/2005 | Johnson | ............. | B25H 1/0092 33/286 |
| 2006/0065650 A1 | 3/2006 | Guo | | |
| 2013/0286635 A1 * | 10/2013 | Dixon | ................. | B25B 21/00 362/119 |

FOREIGN PATENT DOCUMENTS

| | | | | |
|---|---|---|---|---|
| DE | 19953114 A1 * | 5/2001 | ............. | G01B 11/27 |
| DE | 102004011575 A1 * | 9/2005 | ........... | B25H 1/0092 |

* cited by examiner

*Primary Examiner* — Joseph J Hail
*Assistant Examiner* — Joel Crandall
(74) *Attorney, Agent, or Firm* — McDonnell Boehnen Hulbert & Berghoff LLP

(57) ABSTRACT

A targeting apparatus configured for attachment to a handheld blast nozzle is presented that has a housing with a through hole to accept the nozzle, where the housing has a front face surface containing at least three optical devices that can be adjusted to a focal point of convergence of variable distance along a centerline of the nozzle outlet. The targeting apparatus can also include an array of lamps positioned around the front face surface to project task lighting on a workpiece to be blasted.

20 Claims, 3 Drawing Sheets

BLAST NOZZLE TARGETING APPARATUS

FIELD

This disclosure relates to a targeting apparatus for use with a blasting system, more specifically the apparatus is a laser based targeting apparatus that allows an operator to preset a stand-off distance from the surface of a workpiece. The body housing of the targeting apparatus has a through hole that allows insertion of a blast nozzle and secure attachment of the apparatus adjacent the nozzle outlet. The apparatus can also incorporate a task lighting source.

BACKGROUND

Blasting techniques are frequently used to remove or strip coatings from an underlying surface of a workpiece or other substrate. A variety of blasting techniques are known that involve both abrasive and non-abrasive media, where the media is blasted onto a coated substrate at high velocity to remove or alter the coating. High pressure air is typically used as the carrier fluid to provide the driving force to propel the media at the velocities needed to remove a coating. Some blasting systems use a pressurized mix of the media and air while other systems use the venturi effect where high pressure air is passed over a container of the media to create a suction that feeds the media into the flowing air stream. Blasting media varies with the particular coating that is to be removed or treated, however, known media include sand, plastic, glass, water, steel shot, and vegetable based specialty media, such as, cornstarch or soybean blasting media.

Although blasting using robotics is known, many blasting applications necessarily require manual manipulation of a blast nozzle by a human operator. In these applications, the user holds the nozzle by hand and directs the blast media exiting the nozzle at the work surface. The distance as measured from the nozzle outlet to the surface of the workpiece is commonly referred to as the "stand-off" distance. The stand-off distance is directly proportional to the energy of the blasting media as it impacts the workpiece surface. The closer the nozzle is to the surface the greater the velocity of the media at impact. Stand-off distances can be visually estimated by the operator or visually determined using a targeting system that employs one or more lasers. These prior targeting systems typically rely on a combination of a gauge beam and a reference beam in order to set a desired stand-off distance, where only the single reference beam is adjustable. The correct or appropriate stand-off distance is usually a function of several factors, such as, the type of coating to be removed or treated, the type of blast media, the composition of the underlying substrate, the gas pressure of the carrier fluid, and/or the chemical composition of the coating. In many cases the correct stand-off distance is determined by a trial and error approach.

Once the appropriate stand-off distance is determined, the user will work the nozzle around the workpiece to blast the coating. If the nozzle is held too close, the blasting media may damage the underlying workpiece and, if held too far away, there will not be sufficient velocity of the blast media to accomplish the desired amount of treatment or sufficient removal of the coating. Likewise, repeated failure to maintain the stand-off distance, usually caused by improper operator technique during the blasting operation, can yield inconsistent results. Curved and/or contoured surfaces of the workpiece can also contribute to the failure to consistently maintain the proper effective stand-off distance. In sum, operator attentiveness to this parameter can be highly subjective and unreliable.

In general, abrasive blasting presents technical challenges with regard to the most effective and efficient use of the chosen blast media. The quality of the finished part or workpiece depends on the operator's ability to apply the abrasive evenly, but even with a skilled operator there are visibility challenges created by the blast media delivered via pressurized air since dust and debris will rapidly fill the cabinet or blasting area, making it difficult to ensure that the part is being uniformly covered. Stationary incandescent lights mounted in the cabinet and nozzle-mounted lights have been attempted to address some of the visibility problems encountered during blasting procedures. However, in a number of applications such lighting can actually add to the overall visibility problem by illuminating the dust cloud, which then reflects light back to the operator's eyes further reducing visibility of the blasting surface. Although automated/robotic systems have addressed the problem of achieving repeatable uniform coverage to a degree, such systems are large, cumbersome, and expensive, and not readily applicable to hand-held blasting systems.

Accordingly, a need exists to provide a reliable, low cost targeting apparatus to ensure that the appropriate stand-off distance is maintained by an operator using a hand-held blasting apparatus. Preferably such an apparatus would also incorporate an optional task lighting feature that would provide a light source in close proximity to the blast media impact area to avoid or greatly reduce light scatter caused by suspended dust and debris. Such a targeting apparatus would allow the operator to readily maintain the appropriate stand-off distance during the blasting procedure regardless of the shape of the workpiece and would significantly increase the efficiency of the blasting procedure, thus reducing operating costs, while greatly reducing the risk of causing damage to the underlying surface of the workpiece.

SUMMARY

The present disclosure is directed to a targeting apparatus for a hand-held blasting apparatus, the targeting apparatus comprising a body having front face surface, where the body is configured with a through hole to accept a nozzle of the hand-held blasting apparatus and at least three optical devices pivotally coupled to the body, each optical device is configured to generate and project a single beam of light outward from the front face surface, where the three optical devices are positioned relative to each other such that the three single beams of light converge at a focal point of convergence at a predetermined distance along a centerline that matches a nozzle outlet centerline when the body is attached to the hand-held blasting apparatus.

The present disclosure is also directed to a targeting apparatus for a hand-held blasting apparatus, the targeting apparatus comprising a body having front face surface, where the body is configured with a through hole to accept a nozzle of the hand-held blasting apparatus, at least three lasers pivotally coupled to the body, each laser is configured to generate and project a single beam of light outward from the front face surface, where the three lasers are positioned relative to each other such that the three single beams of light converge at a focal point of convergence at a predetermined distance along a centerline that matches a nozzle outlet centerline when the body is attached to the hand-held blasting apparatus, and a plurality of lamps positioned in the front face surface that project task lighting aimed at the nozzle outlet centerline.

The present disclosure is also directed to a method of blasting a workpiece with pressurized media, the method comprising attaching a targeting apparatus to an outside surface of a blast nozzle configured to be hand-held and manipulated by a human operator to effect blasting of a workpiece, where the blast nozzle is positioned in a through hole in a housing of the targeting apparatus, securing the housing to the nozzle such that housing is axially and rotationally fixed relative to the nozzle adjacent an outlet of the nozzle, and adjusting single beams of light from three or more optical devices positioned in the housing such that the beams of light converge to a focal point of convergence at predetermined distance along a centerline of the nozzle outlet.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

Figure 1:
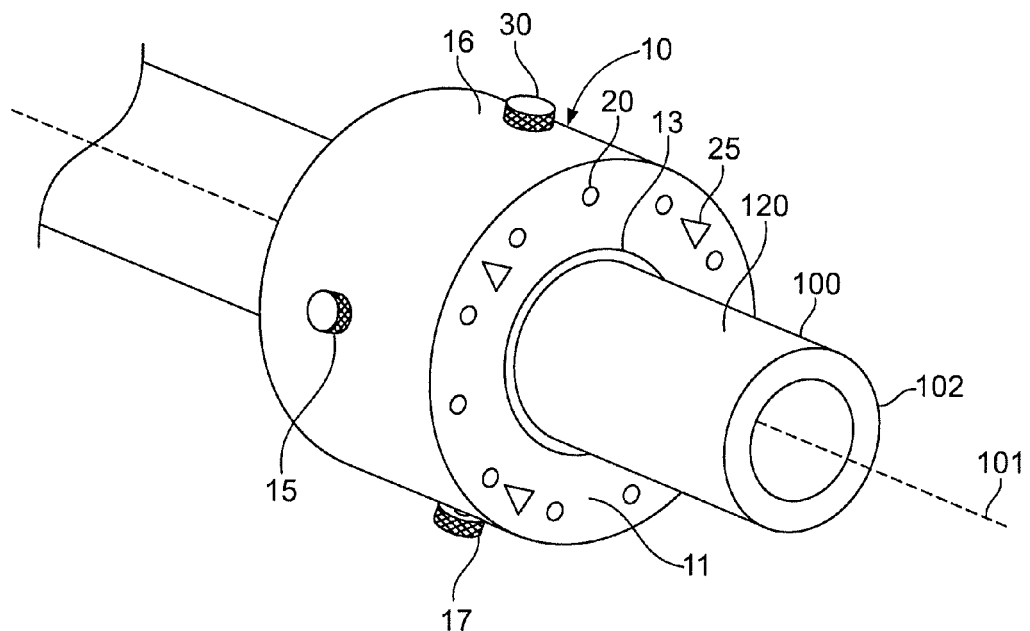
FIG. 1 illustrates a perspective view of one possible advantageous embodiment of the present disclosure.

The present disclosure solves the above-stated needs and is directed to an improved targeting apparatus that can be removably attached and secured to existing hand-held blast nozzles that are part of non-robotic or non-automated blasting systems. The targeting apparatus of this disclosure is configured as an integral part of a blasting system or as a universal apparatus for permanent or removable attachment to a wide variety of different sized and shaped blast nozzles. Typically, blast nozzles are configured as a lance and generally resemble a segment of pipe having a generally circular outside surface defining an internal passage that terminates in a nozzle outlet where a combination of pressurized gas and blast media are discharged and aimed to impinge upon the outer surface of a workpiece or other substrate to be blasted. The pressurized stream of blast media is created by mixing blast media with a regulated flow of air or other gas at a working pressure of from about 5 psig to about 500 psig, more preferably in the range of from about 10 psig to about 120 psig.

The targeting apparatus is readily fitted onto the outer surface of the blast nozzle and then removably fixed to the nozzle using simple hand tools or by simple hand tightening. The targeting apparatus is configured so that when the apparatus is attached to the nozzle a human operator can hold and manipulate the nozzle during the blasting procedure with basically the same effort and dexterity as is possible when the apparatus is not attached.

A visual target or focal point of convergence that can be varied in distance from the targeting apparatus along a centerline projecting out from the nozzle outlet. Preferably, targeting beams emitted by optical devices come together at a single focal point of convergence that is in-line with, but at a desired pre-set distance ahead of, the nozzle opening or outlet. This provides a visual indicator to help the operator maintain an appropriate stand-off distance and also helps to show the center of the blast stream where the forces are most concentrated.

An adjustment mechanism allows an operator to manipulate by hand a single knob, wheel, button or similar control member to set the focal point of convergence at a predetermined distance chosen by the operator after taking into account, for example, the nature of the workpiece, the coating to be removed or treated, and the blasting systems parameters, such as media type and pressure of the carrier fluid.

A plurality of optical devices are included in the targeting apparatus to visually determine whether the blast nozzle centerline is squared with respect to the surface of the workpiece so that the blast media impinging the surface of workpiece is at an approximate right angle, i.e., the nozzle centerline is oriented approx. 90 degrees relative to the surface being blasted. Unlike known targeting systems the targeting apparatus disclosed herein does not require the use of a stand-alone and separately adjustable reference laser beam. Likewise, this disclosed apparatus does not require the use of mirrors or like devices to split or redirect laser beams.

The present disclosure also optionally provides a plurality of task lamps to provide close-up illumination of the workpiece. These optional lamps minimize vision obscuring light diffraction caused by entrained dust, blast media or removed coating particles.

The targeting apparatus is configured to be hand-held, portable, and universally attachable to a large variety of known hand-held blast nozzle configurations. The targeting apparatus may be designed for removable attachment to a hand-held blasting apparatus, preferably to the outer surface of a blast nozzle at a location adjacent to the outlet of the nozzle. The targeting apparatus has a body portion having a front face surface and includes a housing that has a through hole configured to allow insertion of a portion of the blast nozzle. Preferably the through hole is configured such that the front face surface forms a concentric ring around the outer surface of the nozzle. A plurality of optical devices are pivotally coupled to the body and preferably are contained within the housing such that each optical device can project a single beam of light outwardly from the front face surface. Most preferably, at least three optical devices are coupled to the body and spaced equidistantly around the front face surface. Each of the optical devices has a back end and a front end, where the back end can be pivoted when the front end is axially fixed relative to the front face surface. Additionally, the front end of the optical devices can be moved axially relative to the front face surface, and in other possible embodiments of the disclosure, the optical devices can be both pivoted and moved axially relative to the front face surface. Preferably, when one optical device is moved, all the other optical devices are moved simultaneously.

Each of the at least three optical devices is configured to generate and project a single beam of light outward from the front face surface. Preferably each beam is a laser beam from a diode laser, most preferably from a class III A type laser with a wavelength of about 490 to about 780 nanometers (nM) and a peak power of 5 milliwatt (mW). The three optical devices are positioned relative to each other such that the three single beams of light converge at a single focal point of convergence at a predetermined and operator selected distance along a centerline equivalent to or matching the centerline of the nozzle outlet when the targeting apparatus is attached to the blast nozzle of a hand-held blasting apparatus. The convergence of the at least three beams into a single point can be referred to as a focal point of convergence.

The focal point of convergence may or may not be equal to the stand-off distance, which is the distance measured from the nozzle outlet to the surface of the workpiece. In some circumstances it may be desirable to adjust the focal point of convergence of the beams into a convergence point that is positioned behind the outer surface of the workpiece. This is desirable when an operator wishes to ensure the nozzle centerline is square with the outer surface of the workpiece. In such a situation, because the focal point of convergence is further than the stand-off distance the three beams will not converge on the outer surface of the workpiece as a single point and instead will appear as three separate dots on the outer surface. The relative diameter of each dot will provide a visual signal to the operator whether the nozzle outlet and the attached targeting apparatus is positioned at a 90 degree angle relative to the surface of the workpiece. If the blast nozzle centerline is correctly squared, then the three dots will appear uniform in size, shape and relative distance from each other. If the nozzle outlet centerline is not squared, i.e., at an angle of less than 90 degrees, one or more dots will be larger than the others and/or the distance between the dots will not be uniform.

Once a determination is made that the nozzle outlet is appropriately positioned with respect to the workpiece surface, the focal point of convergence can be adjusted to be equal to the stand-off distance. Preferably, the stand-off distance also equals the distance from the nozzle outlet where the blasting parameters, such as velocity, visibility, rate of abrasion, and media type, are optimum for performing the blasting operation. For example, the operator can arrive at a determination of the appropriate stand-off distance through an iterative or trial and error process by performing several sample blasting trials at varying distances from the workpiece surface. If the nozzle centerline becomes no longer squared with the surface of the workpiece during the blasting process (i.e., the nozzle centerline is held at an off angle), the three beams of light will no longer converge to a single point such that two beams will converge to a point and the third beam will appear as a second point visible on the surface.

The targeting apparatus can further include a focal point adjustment mechanism operatively connected to the optical devices that allows the predetermined distance of the focal point of convergence to be increased or decreased as required for either squaring the blast nozzle or optimizing the blasting procedure. Most preferably the focal point of convergence is adjusted using a single knob, wheel, button or other control feature that the operator can access easily, preferably being located on the outside of body housing. A portion of the adjustment mechanism located within the housing is operatively connected to each of the three optical devices to allow the optical devices to pivot, preferably simultaneously, within the housing while maintaining a fixed axial position relative to the front face surface. For example, the adjustment mechanism could include a single knob on the outside of the housing to adjust trunnion-like devices inside the housing that are associated with each optical device to allow the optical device to pivot (like a teeter totter) such that the front end of the optical device moves in an opposite direction to that of the rear end of the optical device. This pivoting movement can be effected by the adjustment mechanism through direct movement of either the front end or rear end of the optical device. The front end of the optical device being the end associated with the front face surface of the targeting apparatus and being the end that emits the beam of light outwardly and forward of the nozzle outlet along the nozzle outlet centerline. In some instances, it may be desirable or necessary to have the adjustment mechanism designed to allow the optical devices to not only pivot, but to also move in an axial direction relative to the housing, i.e., toward and away from the nozzle outlet. In such a configuration, the front end of the optical device could either protrude outwardly from the front face surface or be retracted behind the front face surface. This axial movement is preferably controlled with a single point of adjustment (one knob, wheel, button or the like) and most preferably is controlled by the same single point of adjustment used to pivot the optical devices.

Attachment of the targeting apparatus to a blast nozzle is preferably made through a removable connector, such as, one or more set screws, clamps, tapered surfaces, latches, detents, snap fits, or friction fit. Preferably the removable connector can be tightened and loosened by hand manipulation or through the use of simple hand tools. One preferred configuration of the targeting apparatus that lends itself to convenient attachment to a blast nozzle is where the body housing is shaped as a ring (doughnut shape, annular shape) such that the nozzle is inserted into a through hole of the housing and then secured with a connector (i.e., a set screw) or a pressure activated friction fit. Such a friction fit is used when the through hole is of a tapered design. Preferably the front face surface of the body is uniform in size and shape so that the optical devices are spaced symmetrically around the front face surface and/or circumferentially spaced about the front face surface at equal distances. This configuration allows the targeting apparatus to be attached to the outer surface of the blast nozzle in any circumferential orientation. Stated differently, the targeting apparatus is attached adjacent to the nozzle outlet without concern for the radial orientation relative to the nozzle surface.

Another preferred design of the body housing uses two clamshell halves that, when closed around a nozzle, form the through hole such that the front face surface forms an annular ring with respect to the nozzle when the targeting apparatus is attached. This design finds usefulness when the nozzle outlet or the surface immediately adjacent the nozzle outlet is non-uniform or contains one or more protrusions that impedes the targeting apparatus from sliding over the nozzle outlet. When set screws are used as a connector to removably connect the targeting apparatus to the nozzle preferably the set screws project through the body housing and into the through hole where the terminal end of the set screw can make contact with the outer surface of the nozzle. The other end of the set screw can be accessed from the outside of the body to tighten or loosen the set screw. In the case of a clamp connector, a clamping surface is located circumferentially on the body and forms and/or defines the through hole. Manipulation of a knob on the outer surface of the body housing causes the clamp connector to decrease in diameter and tighten around the outer surface of the nozzle, similar to how an adjustable hose clamp functions.

The targeting apparatus can also have a gasket associated with the through hole, where the gasket is configured to contact the outer surface of the nozzle. Preferably the gasket is a compressible material, for example rubber, that provides vibration dampening and/or a friction bearing surface. The gasket can also be compressible to compensate for varying outside diameters of different blast nozzles or imperfections in the outer surface of the nozzles. The gasket material is preferably glued or otherwise permanently secured to a portion or the entire inner surface of the through hole. In some cases it may be desirable to use varying thickness of the gasket materials to create a tapered internal through hole of the targeting apparatus. Additionally, the gasket may be integral with a clamp connector.

In a particularly preferred configuration, the targeting apparatus includes a plurality of lamps positioned in the front face surface that project task lighting oriented and aimed generally at and along the centerline of the nozzle to provide illumination of the surface of the workpiece. These lamps preferably are light emitting diodes (LEDs) and can be positioned to form an annular array of lamps in the front face surface around the through hole. A lens (or lenses) can be provided to direct and/or intensify the illumination at the surface of the workpiece.

The targeting apparatus can be powered by an onboard battery system contained within the body housing with one or more batteries powering the optical devices and lamps. Alternatively, power can be obtained from one or more external sources and provided through a detachable wiring harness or plug. One or more switches can be included on the body of the targeting apparatus and operatively connected to the optical devices and/or lamps. Alternatively, the switch or switches can be remotely located, for example being operatively connected to the blasting apparatus. In a preferred configuration at least one switch operates both the optical devices and the blasting apparatus. This switch is a multiple position switch that, when in a first position, the optical devices are activated and, when in a second position, the blasting apparatus is activated while the optical devices remain activated. In a configuration that includes the task lamps on the targeting apparatus, the same or a separate switch can independently control activation of the lamps. This multiple position switch could allow an operator to use the lamps to illuminate the workpiece, activate the optical devices to square the nozzle outlet as described above, and then to pre-set the desired stand-off position to be used during the blasting procedure. As most conventional blasting systems use some form of trigger to activate the discharge of blasting media from the nozzle outlet, a preferred switching system of the targeting apparatus would involve combining the multiple position switch with the triggering system of the blasting apparatus, for example through the use of one or more pressure sensitive micro-switches or other force sensing devices such that the operator uses one hand on the switch to control the optical devices and the blasting apparatus.

Figure 2:
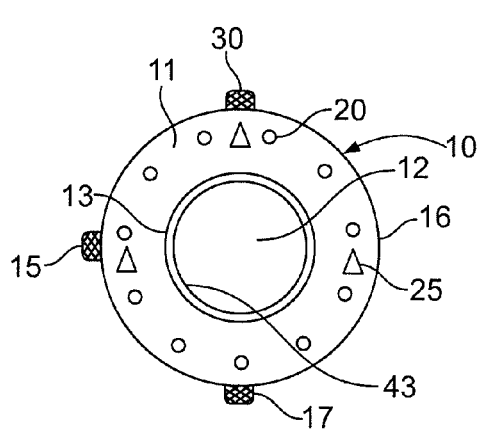
FIG. 2 is a front view of the possible embodiment shown in FIG. 1.
Figure 4:
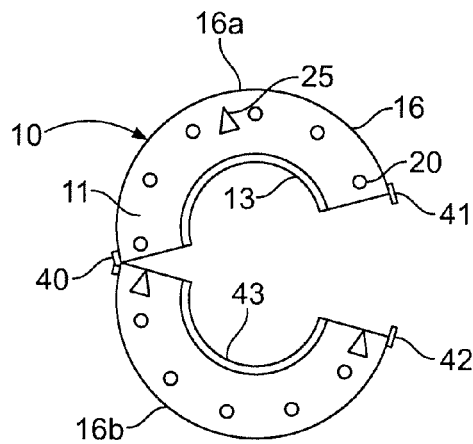
FIG. 4 illustrates an alternative embodiment of the disclosure where the body is formed from two halves.
Figure 3:
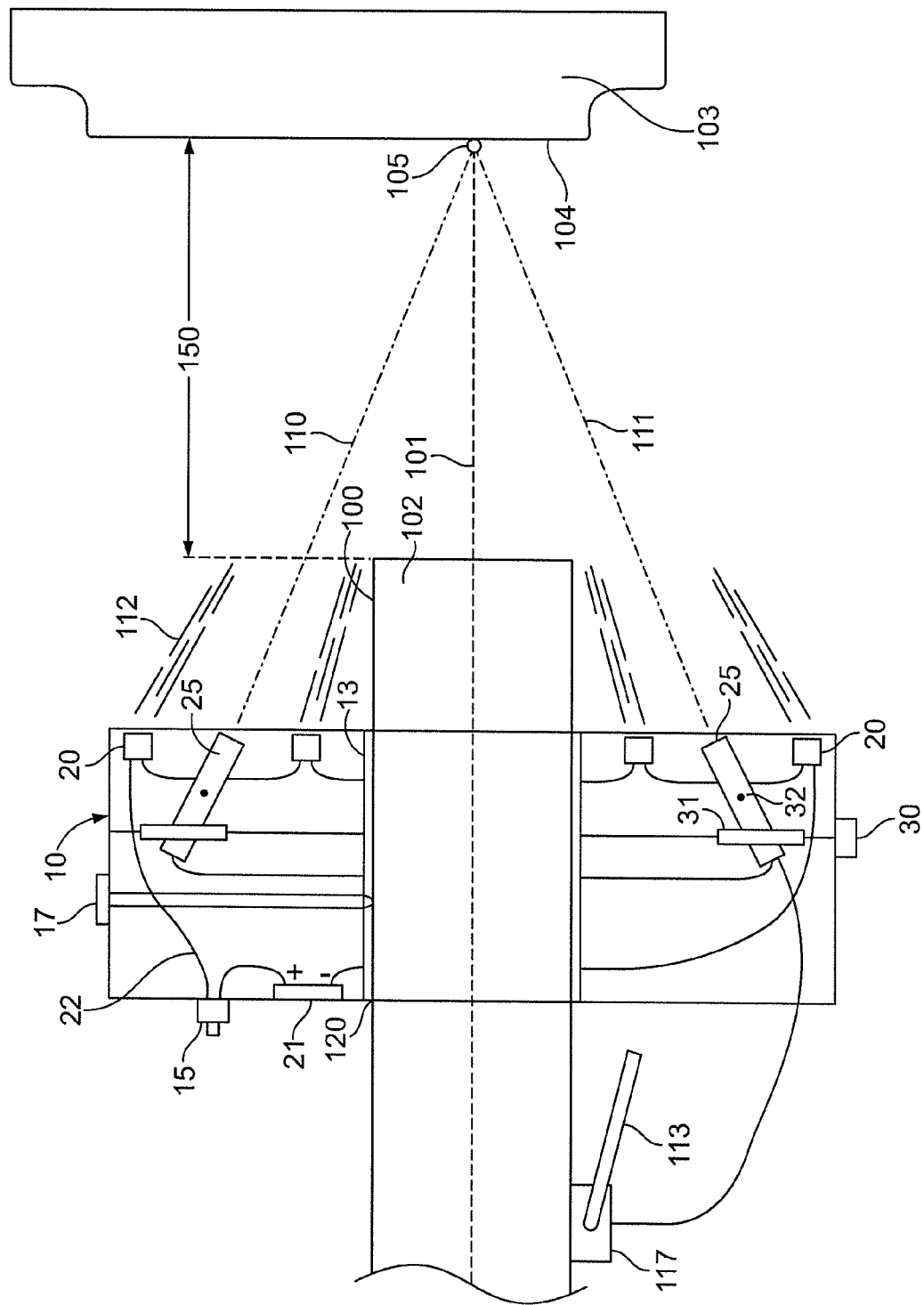
FIG. 3 presents a cross-sectional schematic diagram of the embodiment of shown in FIG. 1.

The present disclosure also relates to a method of blasting a workpiece with pressurized media where a targeting apparatus as described above is attached to the outside surface of a hand-held nozzle. The nozzle is first inserted into the through hole in the body of the targeting apparatus or, in the case of a clamshell configuration, the two halves of the body housing are closed around the outside surface of the nozzle. Preferably the targeting apparatus is situated on the nozzle adjacent to or as close as possible to the nozzle outlet. The targeting apparatus is then secured to the nozzle using a clamp, set screw, friction fit or a combination of these connection devices such that the body housing is axially and rotationally fixed relative to the nozzle. Once the targeting apparatus is fixed to the nozzle, the operator can square the nozzle outlet centerline relative to the workpiece surface and then proceed to adjust the optical devices to set a predetermined stand-off distance along the centerline of the nozzle outlet. This is preferably accomplished by simultaneously adjusting the single beams of light from three or more optical devices positioned in the housing such that the beams of light converge to single point at the predetermined stand-off distance along a centerline of the nozzle outlet. Once the desired stand-off distance is set, the operator can then move the nozzle relative to the workpiece such that a single point or dot representing the convergence of three or beams of light is positioned on an outer surface of the workpiece. When a single point of light, the focal point of convergence, appears on the surface of the workpiece the targeting apparatus indicates that the nozzle outlet is correctly positioned at the predetermined stand-off distance. A switch or other triggering mechanism is then activated to cause the pressurized media to exit the nozzle outlet and impinge on the outer surface of the workpiece. Preferably the operator can manipulate a single adjustment knob to adjust the single beams of light to move the focal point of convergence closer to or further away from the front face surface of the targeting apparatus along the centerline of the nozzle outlet. Additionally, the method may include configuring a switch to simultaneously operate the optical devices, optional lamps, and blast nozzle The targeting apparatus of the present disclosure can be designed for permanent or removable attachment to a wide variety of nozzles used and associated with most standard hand-held blasting equipment. FIG. 11 illustrates one possible design of a targeting apparatus 10 shown attached to a blast nozzle 100 inserted into and/or through a through hole 12 of a body housing 16. The nozzle 100 has a nozzle outlet centerline 101 that projects through a nozzle body having a nozzle outlet 102 and generally represents the path followed by the pressurized blast media when a blasting apparatus is in operation. FIG. 2 illustrates a front face surface 11 of body 16 of targeting apparatus 10 and the positioning of optical devices 25 and optional lamps 20 with respect to each other and the front face surface 11. Although three optical devices 25 are illustrated, additional optical devices 25 can be included. A clamping surface 43 is shown as an adjustable annular bearing surface adjacent a gasket 13. As the clamping surface 43 is tightened, for example using a set screw 17, the gasket and clamping surface 43 become fixedly secured to the outer surface 120 of an inserted nozzle 100. FIG. 3 schematically shows one example of the internal components of targeting apparatus 10, including a possible electrical wiring and power configuration. FIG. 4 illustrates an alternative clamshell design where two halves 16a, 16b of the body 16 are pivotally connected through hinge 40 and can be secured together through latch connectors 41 and 42.

Lining the through hole 12 is gasket 13 that makes contact with outer surface 120 of nozzle 100. A set screw 17 secures the targeting apparatus 10 to the nozzle 100 such that the targeting apparatus is fixed axially and rotationally relative to the nozzle 100. Adjustment knob 30 is operatively connected to the optical devices 25 such that the manipulation of knob 30 simultaneously adjusts all the optical devices 25 by pivoting the optical devices about a pivot point 32 and/or moving the optical devices axially relative to body 16 through a common connection, such as through retaining ring 31. Each optical device projects a single beam 110 of light, preferably a laser light, directed along the nozzle outlet centerline 101 of nozzle outlet 102 such that the beams intersect with each other at a single point or a focal convergence point 105. When the beams are adjusted such that the focal point of conference point 105 appears on the blast surface 104 of workpiece 103, the targeting apparatus has been adjusted to a predetermined distance that equals the stand-off distance 150. In situations where close-up direct illumination of the workpiece is desired the targeting apparatus 10 can optionally include a plurality of lamps 20, preferably where each lamp is a light emitting diode (LED), positioned so that the lamps 20 project task lighting out of the front face surface 11 of body 16 in a direction 112 to illuminate blast surface 104 of the workpiece 103.

As mentioned, FIG. 3 illustrates one possible configuration of the internal components of the targeting apparatus. Specifically, FIG. 3 illustrates how power is provided power to the optical devices and the optional lamps. This schematic representation is applicable to each targeting apparatus shown in FIGS. 1, 2 and 4-6, where the components or parts that are marked with the same reference symbols are the same and can be interchanged in each of the targeting apparatus illustrated. The lamps 20 can be wired in series such that an on/off switch 15 activates all the lamps 20 simultaneously. The switch 15 is operatively connected to power source 21, represented as a DC battery. Power source 21 preferably is configured to be easily replaced and/or recharged, for example using a AC/DC converter. Of course, AC power could be used as the power source 21. Switch 15 can be configured as a simple on/off toggle switch or a pressure sensitive switch. The optical devices 25 could be wired into the power circuit 22 used for lamps 20, however, a preferred wiring set-up is shown in FIG. 3 where the lamps 20 can be activated separately from the optical devices 25. As illustrated, the optical devices 25 are wired together and operatively connected to a triggering mechanism 117 configured to allow activation of the blasting apparatus. Triggering mechanism 117 includes a pressure sensitive trigger 113 that has multiple activation positions. For example, in one possible configuration the trigger 113 is pushed, squeezed, or otherwise moved to a first position to activate the targeting optical devices 25 and then moved further to a second position where the optical devices 25 remain activated and the pressurized blasting media is caused to discharge through the nozzle outlet 102. Releasing pressure on the trigger 113 would cause the trigger 113 to move back to the first position where the flow of blast media is stopped, but the optical devices 25 remain activated. Further release of pressure causes the trigger 113 to move to the starting or initial position where the optical devices 25 are deactivated.

Figure 6:
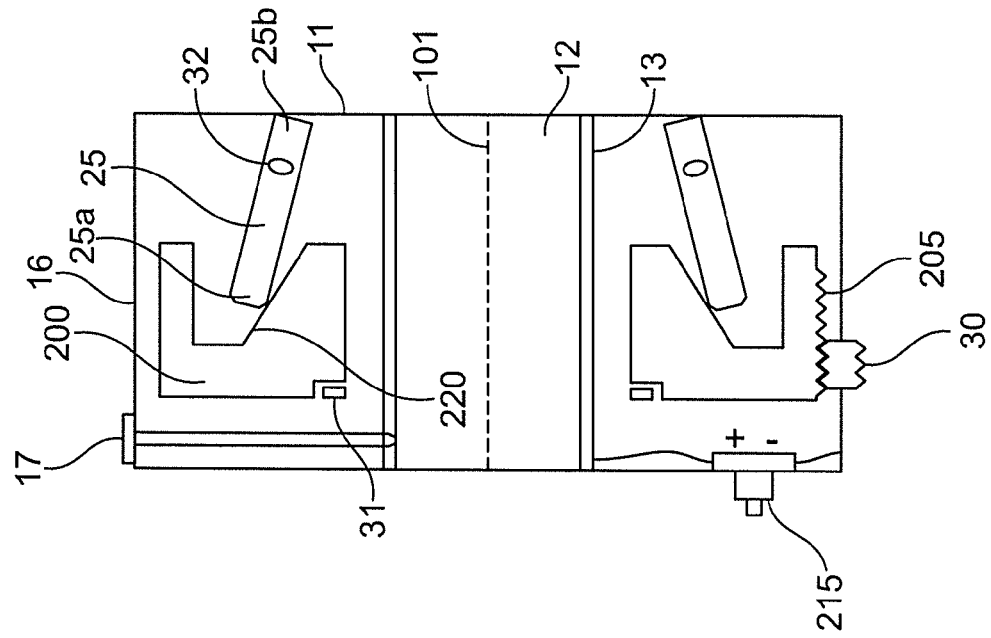
FIG. 6 illustrates a side cross-sectional view of the alternative embodiment of FIG. 5.
Figure 5:
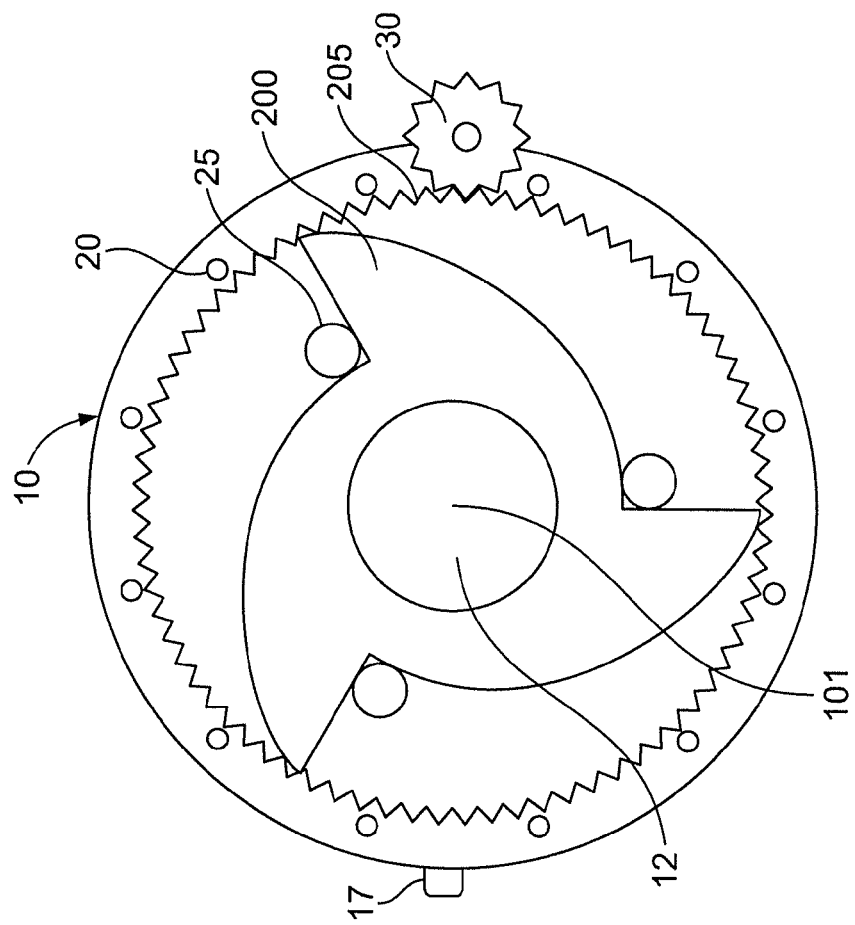
FIG. 5 illustrates front view of an alternative embodiment of the disclosure where cams are used to adjust the focal convergence point.

FIGS. 5 and 6 illustrate another possible configuration of the disclosure where cams 200 are used to adjust the focal point of convergence 105 of optical devices 25. The cams 200 in FIGS. 5 & 6 could be used in each targeting apparatus shown in FIGS. 1-4, where the components or parts that are marked with the same reference symbols are the same and can be interchanged in each of the targeting apparatus illustrated. Each cam has a cam surface 220 that engages the rear end of the optical device 25. As cam 200 is moved axially relative to the front face surface 11, the rear end 25a of the optical device 25 functions as a cam follower causing the optical devices 25 to pivot about pivot point 32. The cam moves axially relative to the nozzle outlet centerline 101 by adjustment of the adjusting knob 30 that is in toothed engagement with cam ring 205. As the optical device 25 pivots about pivot point 32, the front ends 25b of the optical devices 25 articulate inward toward the nozzle outlet centerline 101 or outward away from the nozzle outlet centerline 101 depending on the direction of movement of the cam 200. Retaining ring 31 is engaged with each cam 200 to ensure each of cams 200 move axially the same distance when adjusting knob 30 is rotated clockwise or counter clockwise. Switch 215 can be used to energize the optical devices 25, the task lights 20 or both.

The foregoing description of the specific embodiments will reveal the general nature of the disclosure so others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The invention claimed is:

1. A targeting apparatus for a hand-held blasting apparatus, the targeting apparatus comprising:
   a body having front face surface, where the body is configured with a through hole to accept a nozzle of the hand-held blasting apparatus; and
   at least three optical devices pivotally coupled to the body, each optical device is configured to generate and project a single beam of light outward from the front face surface, where the at least three optical devices are positioned relative to each other such that the at least three single beams of light converge at a focal point of convergence at a predetermined distance along a centerline that matches a nozzle outlet centerline when the body is attached to the hand-held blasting apparatus,
   wherein the body comprises two clamshell halves that form the through hole such that the front face surface forms a concentric ring with respect to the nozzle when the body is attached to the hand-held blasting apparatus,
   wherein the two clamshell halves are pivotally coupled via a hinge.

2. The targeting apparatus of claim 1 further comprising a focal point adjustment mechanism operatively connected to the at least three optical devices to set the predetermined distance, wherein the focal point adjustment mechanism comprises a single knob, a single wheel, or a single button on an outer surface of the body,
   wherein, to set the predetermined distance, the focal point adjustment mechanism is at least one of (i) configured to simultaneously pivot the at least three optical devices relative to the body or (ii) configured to simultaneously move the at least the at least three optical devices axially relative to the body.

3. The targeting apparatus of claim 2 where the focal point adjustment mechanism comprises a single knob.

4. The targeting apparatus of claim 1 where the body has one or more set screws configured to project into the through hole and allow connection of the body to the nozzle of the hand-held blasting apparatus.

5. The targeting apparatus of claim 1 further comprising a clamping surface on the body that defines the through hole, where the clamping surface is configured to allow connection of the body to the nozzle of the hand-held blasting apparatus.

6. The targeting apparatus of claim 1 further comprising a gasket associated with the through hole and configured to contact the nozzle of the hand-held blasting apparatus.

7. The targeting apparatus of claim 6 where the gasket and the through hole define a tapered inner surface configured to contact the nozzle of the hand-held blasting apparatus.

8. The targeting apparatus of claim 1 where the optical devices each comprise a laser.

9. The targeting apparatus of claim 1 further comprising at least one battery operatively connected to the optical devices.

10. The targeting apparatus of claim 1 further comprising at least one switch operatively connected to the optical devices and configured for activation by the hand-held blasting apparatus.

11. A targeting apparatus for a hand-held blasting apparatus, the targeting apparatus comprising:
- a body having a front face surface, where the body is configured with a through hole to accept a nozzle of the hand-held blasting apparatus; and
- at least three lasers pivotally coupled to the body, each laser is configured to generate and project a single beam of light outward from the front face surface, where the at least three lasers are positioned relative to each other such that the at least three single beams of light converge at a focal point of convergence at a predetermined distance along a centerline that matches a nozzle outlet centerline when the body is attached to the hand-held blasting apparatus;
- a plurality of lamps positioned in the front face surface that project task lighting aimed at the nozzle outlet centerline,
- wherein the body comprises two clamshell halves that form the through hole such that the front face surface forms a concentric ring with respect to the nozzle when the body is attached to the hand-held blasting apparatus,
- wherein the two clamshell halves are pivotally coupled via a hinge.

12. The targeting apparatus of claim 11 where the lamps each comprise a light emitting diode (LED).

13. The targeting apparatus of claim 12 where the lasers and LEDs are positioned to form a concentric ring around the through hole.

14. The targeting apparatus of claim 11 further comprising at least one switch configured to activate the lasers independently from the lamps.

15. The targeting apparatus of claim 14 where the at least one switch is operatively connected to the hand-held blasting apparatus when the body is connected to the nozzle of the hand-held blasting apparatus.

16. A method of blasting a workpiece with pressurized media, the method comprising:
- attaching a targeting apparatus to an outside surface of a blast nozzle configured to be hand-held and manipulated by a human operator to effect blasting of a workpiece, where the blast nozzle is positioned in one of two clamshell halves, where the two clamshell halves when closed define a through hole in a housing of the targeting apparatus, wherein the two clamshell halves are pivotally coupled via a hinge;
- securing the housing to the nozzle by clamping the two clamshell halves together such that housing is axially and rotationally fixed relative to the nozzle adjacent an outlet of the nozzle;
- generating and projecting a single beam of light from each of three or more optical devices outward from a front face surface of the housing, wherein the three or more optical devices are in the housing; and
- adjusting the beams of light from the three or more optical devices such that the beams of light converge to a focal point of convergence at predetermined distance along a centerline of the outlet of the nozzle.

17. The targeting apparatus of claim 11 further comprising a focal point adjustment mechanism operatively connected to the at least three optical devices to set the predetermined distance, wherein the focal point adjustment mechanism comprises a single knob, a single wheel, or a single button on an outer surface of the body,
- wherein, to set the predetermined distance, the focal point adjustment mechanism is at least one of (i) configured to simultaneously pivot the at least three optical devices relative to the body or (ii) configured to simultaneously move the at least the at least three optical devices axially relative to the body.

18. The method of claim 16, wherein the targeting device comprises a focal point adjustment mechanism operatively connected to the three or more optical devices to set the predetermined distance, wherein the focal point adjustment mechanism comprises a single knob, a single wheel, or a single button on an outer surface of the housing, and
- wherein adjusting the single beams of light comprises manipulating the focal point adjustment mechanism to at least one of (i) simultaneously pivot the at least three optical devices relative to the housing or (ii) simultaneously move the at least three optical devices axially relative to the housing, and thereby adjust the single beams of light so to move the focal point of convergence closer to or further away from the targeting apparatus.

19. The method of claim 16 further comprising activating a switch to simultaneously operate the optical devices and the blast nozzle.

20. The method of claim 19 wherein the activation of the switch comprises applying pressure to a pressure sensitive micro-switch.

* * * * *